United States Patent
Aoyama et al.

(10) Patent No.: US 7,147,696 B2
(45) Date of Patent: Dec. 12, 2006

(54) FLUORESCENT WATER BASE INK FOR INK-JET RECORDING

(75) Inventors: Michiko Aoyama, Nagoya (JP); Masashi Tsuda, Aichi-ken (JP); Hideto Yamazaki, Nagoya (JP); Hiromitsu Sago, Tokai (JP); Mayuko Umemura, Chiryu (JP); Shunichi Higashiyama, Yotsukaichi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 10/917,224

(22) Filed: Aug. 12, 2004

(65) Prior Publication Data

US 2005/0039633 A1    Feb. 24, 2005

(30) Foreign Application Priority Data

Aug. 20, 2003    (JP) .............................. 2003-296702

(51) Int. Cl.
*C09D 11/02*    (2006.01)

(52) U.S. Cl. ............................. 106/31.32; 106/31.28; 106/31.43; 106/31.58; 106/31.64; 106/31.86

(58) Field of Classification Search ............. 106/31.32, 106/31.28, 31.43, 31.64, 31.58, 31.86
See application file for complete search history.

(56) References Cited

U.S. PATENT DOCUMENTS

| | | | | |
|---|---|---|---|---|
| 5,135,569 A | * | 8/1992 | Mathias | 106/31.32 |
| 5,702,511 A | * | 12/1997 | de Saint-Romain et al. | 106/31.32 |
| 6,176,908 B1 | | 1/2001 | Bauer et al. | |
| 6,494,943 B1 | * | 12/2002 | Yu et al. | 106/31.65 |
| 6,676,734 B1 | * | 1/2004 | Nagashima et al. | 106/31.32 |
| 6,893,491 B1 | * | 5/2005 | Yamazaki et al. | 106/31.86 |
| 6,896,724 B1 | * | 5/2005 | Sun et al. | 106/31.86 |
| 2005/0279247 A1 | * | 12/2005 | Auslander et al. | 106/31.28 |
| 2005/0279248 A1 | * | 12/2005 | Auslander et al. | 106/31.28 |
| 2005/0279249 A1 | * | 12/2005 | Auslander et al. | 106/31.32 |

FOREIGN PATENT DOCUMENTS

GB    2098622    * 12/1982

* cited by examiner

*Primary Examiner*—Helene Klemanski
(74) *Attorney, Agent, or Firm*—Reed Smith LLP

(57) ABSTRACT

A fluorescent water base ink for ink-jet recording to be used for an ink-jet printer contains water, a pigment, a compound having primary or secondary amide group, and a fluorescent dye represented by the following formula (1):

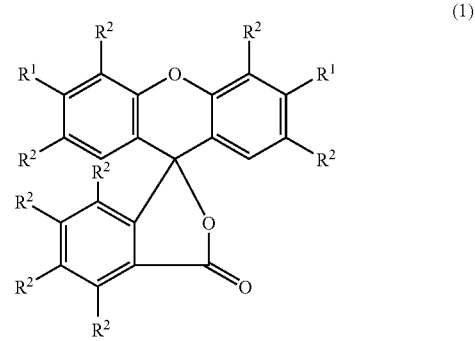

wherein $R^1$ represents OH or $N(R^3)R^4$, $R^2$ represents hydrogen atom or halogen atom, and each of $R^3$ and $R^4$ represents hydrogen atom or alkyl group. A sufficient OD value and a fluorescence value are obtained while securing the vivid color development and the excellent water resistance principally in accordance with the interaction of the fluorescent dye and the compound having the amide group.

7 Claims, 1 Drawing Sheet

FLUORESCENT WATER BASE INK FOR INK-JET RECORDING

BACKGROUND OF THE INVENTION

1. Field of the Invention

The present invention relates to a fluorescent water base ink for ink-jet recording which makes it possible to obtain a sufficient optical density value (OD value) and a fluorescence value while securing vivid color development and excellent water resistance.

2. Description of the Related Art

In the ink-jet recording system, ink droplets are formed by using the ink discharge method including, for example, the electrostatic attraction method, the method in which mechanical vibration or displacement is applied to the ink by using a piezoelectric element, and the method in which bubbles are generated by heating the ink to utilize the pressure generated thereby. All or a part of the ink droplets are adhered to a recording objective material such as paper to perform the recording. The ink-jet recording method does not involve the process including, for example, those for the development and the fixation, in which it is easy to realize the color printing. Therefore, in recent years, the ink-jet recording method has remarkably come into widespread use. Recently, the high definition printing and the high speed printing based on the ink-jet printer are rapidly advanced. Further, for example, the color printer, which is capable of performing the printing on regular paper, is dominantly used.

In such circumstances, the performance, which is required for the ink for ink-jet recording to be used for the ink-jet recording method, is to be at a high level. For example, the following performance is required. That is, a recording image, which involves vivid color development, is given. The water resistance is excellent after forming the image. The image is quickly dried when the image is formed on the recording paper, and the rub resistance is satisfactory. No clog-up is caused in the ink flow passage and at the head discharge section of the ink-jet printer, making it possible to perform the stable jetting operation. Neither fading nor discoloration arises after forming the image, and the light resistance and the gas resistance are excellent. In particular, the formation of the recording image having the vivid color development and the water resistance after forming the image are extremely important factors of the performance to realize the image quality equivalent to that of the photograph in which the image is vivid and no blurring occurs.

There have been disclosed inks having vivid color development and excellent water resistance. For example, U.S. Pat. No. 6,176,908 discloses an ink for a postage meter which contains a pigment and a fluorescent dye such as acid dye, direct dye, and basic dye as coloring agents for the ink and which is added with a resin-based dispersing agent for dispersing the pigment. However, in the case of the ink as described above, for example, the acid dye, the direct dye, and the basic dye, which are used as the fluorescent dye, are easily dissolved in water, because the dyes themselves are salts. Even when such a dye is used in combination with the pigment, the water resistance is not sufficient after forming the image.

On the other hand, an ink has been investigate, which is based on the use of a fluorescent dye that is excellent in water resistance as a fluorescent dye having the xanthene skeleton. When such a fluorescent dye is used, it is possible to obtain an fluorescent ink which has extremely excellent water resistance. However, when a fluorescent water base ink for ink-jet recording is manufactured by using a fluorescent dye as described above, a problem has arisen such that any sufficient OD value is not obtained due to the poor water solubility of the fluorescent dye itself.

SUMMARY OF THE INVENTION

The present invention has been made in order to solve the problem as described above, an object of which is to provide a fluorescent water base ink for ink-jet recording which makes it possible to obtain a sufficient OD value and a fluorescence value while securing the vivid color development and the excellent water resistance.

According to the present invention, there is provided a fluorescent water base ink for ink-jet recording comprising water, a pigment, a compound having primary or secondary amide group, and a fluorescent dye represented by the following formula (1):

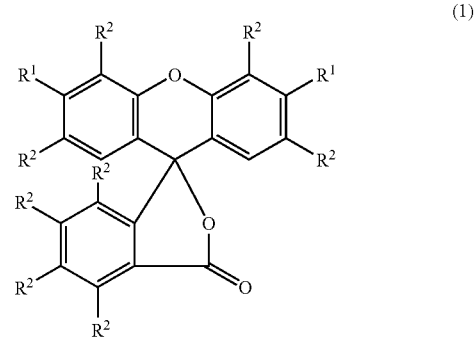

wherein $R^1$ independently represents OH or $N(R^3)R^4$, $R^2$ independently represents hydrogen atom or halogen atom, $R^3$ represents hydrogen atom or alkyl group having a number of carbon atom or atoms of 1 to 5, and $R^4$ represents hydrogen atom or alkyl group having a number of carbon atom or atoms of 1 to 5.

The following fact has been revealed by the inventors. That is, when the pigment and the fluorescent dye having the water resistance are used in combination, the fluorescence value of the fluorescent ink is lowered as compared with a case in which the fluorescent dye is used singly. If the pigment is added to such an extent that a sufficient OD value is obtained, it is impossible to obtain any vivid color development possessed by the fluorescent dye, probably for the following reason. That is, it is considered that the fluorescence, which is emitted by the fluorescent dye, is blocked and absorbed by the pigment which exists as a solid matter in the ink. The inventors have succeeded in the provision of the novel ink which has a sufficient OD value while securing the vivid color development and the excellent water resistance. It is considered that such an excellent effect is principally based on the interaction of the fluorescent dye and the compound having the primary or secondary amide group as described later on.

According to another aspect of the present invention, there is also provided in ink cartridge comprising the ink of the present invention. The ink cartridge is provided with a container having an arbitrary shape for accommodating the ink. The ink cartridge may be carried on an ink-jet head, or the ink cartridge may be attached to the interior of a main body case of an ink-jet recording apparatus. In the case of the latter, the ink is supplied from the ink cartridge to the ink-jet head, for example, through a flexible tube.

DESCRIPTION OF THE PREFERRED EMBODIMENTS

Figure 1:
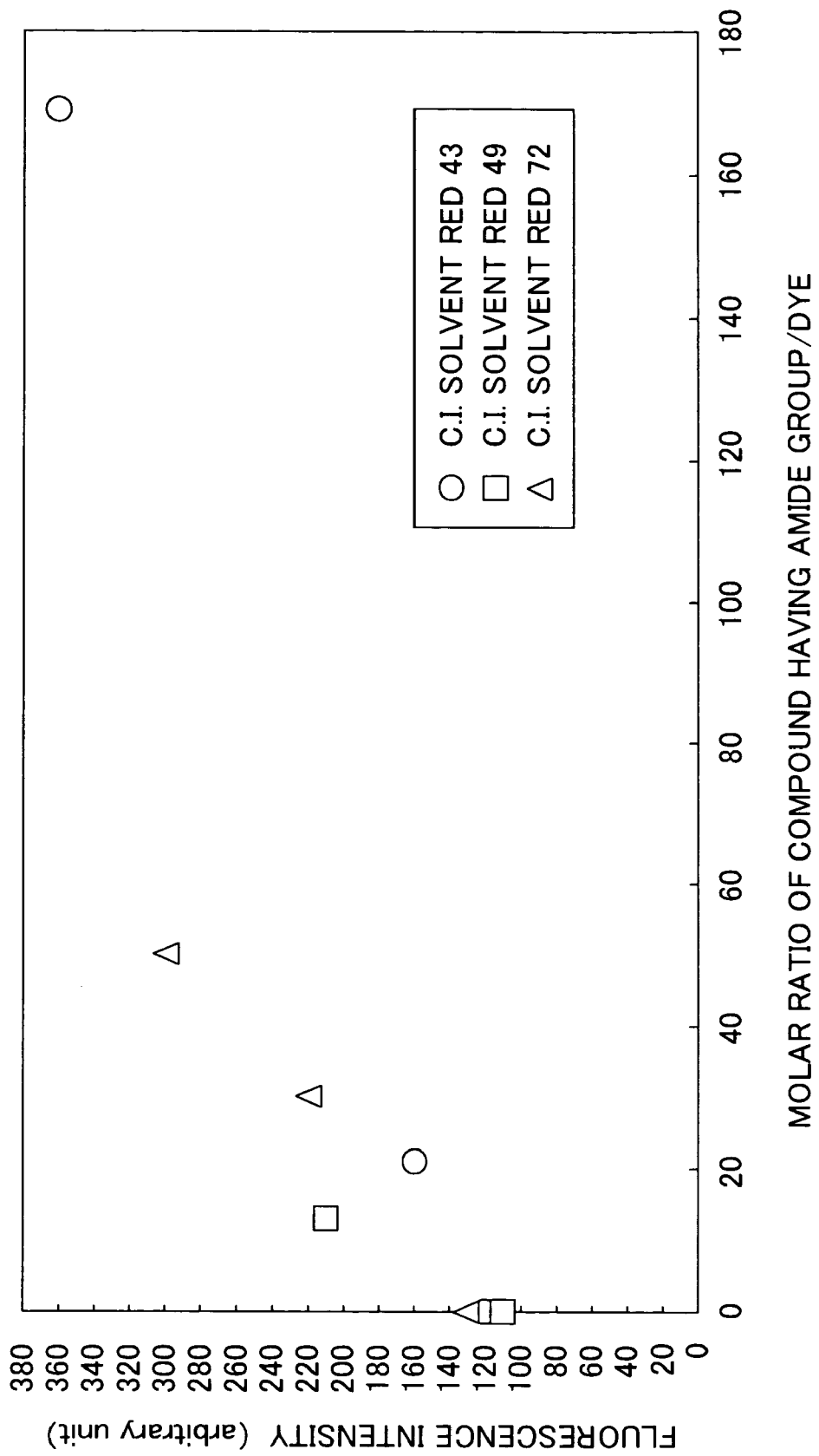
FIG. 1 is a graph showing the relationship between the fluorescence intensity (value) and the molar ratio of the compound having the amide group with respect to the dye.

The fluorescent water base ink for ink-jet recording of the present invention contains the fluorescent dye represented by the formula (1) described above. The fluorescent dye represented by the foregoing formula (1) has the xanthene skeleton. Therefore, the fluorescent dye has low water solubility, and it is excellent in water resistance after forming an image. In the formula (1), $R^1$ independently represents OH or $N(R^3)R^4$. $R^2$ independently represents hydrogen atom or halogen atom. For example, all $R^2$'s may be hydrogen or halogen. Alternatively, at least one $R^2$ may be hydrogen, and remaining $R^2$ may be halogen. $R^3$ represents hydrogen atom or alkyl group having a number of carbon atom or atoms of 1 to 5 and preferably having a number of carbon atom or atoms of 1 to 2. $R^4$ represents hydrogen atom or alkyl group having a number of carbon atom or atoms of 1 to 5 and preferably having a number of carbon atom or atoms of 1 to 2.

The fluorescent dye represented by the foregoing formula (1) is not specifically limited, which may include, for example, C.I. Solvent Red 43, 48, 49, 72, and 73 represented by the following formulas (2) to (6) respectively. The fluorescent dye as described above may be used singly. Alternatively, two or more of the fluorescent dyes as described above may be used in combination.

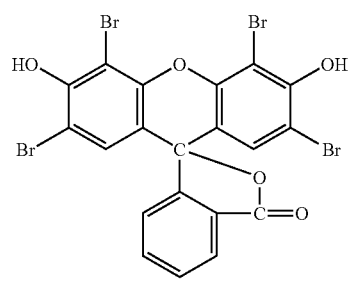
(2)

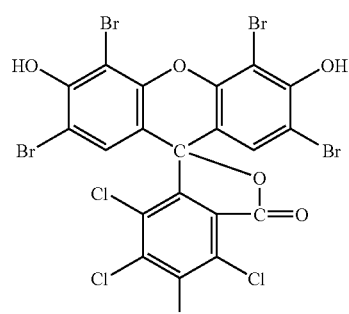
(3)

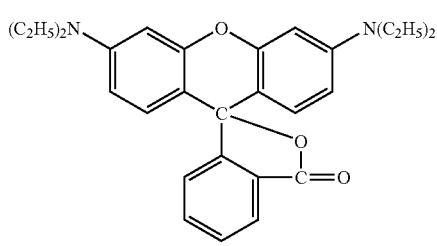
(4)

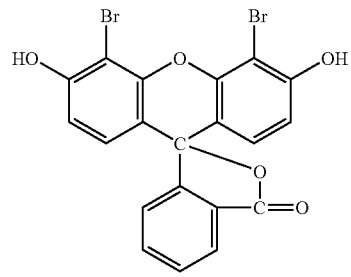
(5)

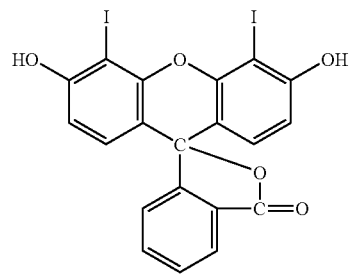
(6)

It is preferable that the content of the fluorescent dye represented by the formula (1) is 0.1 to 2.0% by weight with respect to the total amount of the fluorescent water base ink for ink-jet recording. If the content is less than 0.1% by weight, the ink does not emit sufficient fluorescence. If the content exceeds 2.0% by weight, then a quenching phenomenon occurs in which the excited molecules mutually consume the energy to counteract the mutual fluorescence, and the fluorescence value is lowered in some cases. More preferably, the content is 0.3 to 1.0% by weight.

The fluorescent water base ink for ink-jet recording of the present invention contains the pigment. The pigment works an auxiliary coloring agent to enhance the OD value of the fluorescent water base ink for ink-jet recording.

It is preferable that the pigment is a self-dispersing pigment which has been subjected to a surface-modifying treatment and which can be stably dispersed without using any dispersing agent. In the case of the pigment which requires the dispersing agent, the surface tension of the ink is lowered depending on the dispersing agent to be used. As a result, the ink is not discharged normally in some cases, and the permeability balance of the ink with respect to the recording paper is collapsed to deteriorate the printing quality in other cases. Further, in this case, the dispersing agent badly affects the dispersed state of the fluorescent dye and the pigment, for example, upon the evaporation of the ink, and the coagulation and the deposition are sometimes caused. The surface modification is performed by bonding a hydrophilic functional group such as carboxyl group, carbonyl group, and hydroxyl group or a salt thereof to the surface of the pigment directly or via alkyl group, alkyl ether group, aryl group or the like. Specifically, there may be exemplified, for example, a method in which the hydrophilic functional group is introduced by a chemical treatment in which the pigment surface is oxidized with an oxidizing agent in water, and a method in which the pigment surface is grafted with a hydrophilic functional group or an active species containing a hydrophilic functional group.

The self-dispersing pigment as described above is not specifically limited provided that the self-dispersing pigment is dispersible in the aqueous phase. Those commercially available may include, for example, CAB-O-JET 260 (produced by Cabot).

It is preferable that the content of the pigment is 0.5 to 3.0% by weight as solid content with respect to the total amount of the fluorescent water base ink for ink-jet recording. If the content is less than 0.5% by weight, the ink does not show sufficient OD value. If the content exceeds 3.0% by weight, it is difficult to secure the dispersion stability of the ink, because the amount of the solid content dispersed in the ink is large. In this case, the coagulation is apt to occur, for example, upon the evaporation of water, and the discharge stability of the ink is affected thereby in some cases. More preferably, the content of the pigment is 1.0 to 3.0% by weight.

The fluorescent water base ink for ink-jet recording of the present invention contains the compound having the primary or secondary amide group. As a result of diligent investigations performed by the inventors, the following fact has been found out. That is, when the compound having the primary or secondary amide group is contained in the fluorescent water base ink for ink-jet recording, it is possible to enhance the fluorescence performance of the fluorescent dye. As a result, it is possible to avoid the decrease in fluorescence value which would be otherwise caused by the presence of the pigment.

The compound having the primary or secondary amide group is not specifically limited. The compound may include, for example, acetamide, urea, ε-caprolactam, hydantoin, dimethylhydantoin, succinimide, and 2-pyrrolidone. The compound as described above may be used singly, or in combination of two or more of the compounds as described above.

It is preferable that the polarity value of the compound having the primary or secondary amide group is not less than 3.5, for the following reason. That is, as the polarity of the compound having the primary or secondary amide group is larger, the effect to increase the fluorescence value becomes larger. Therefore, if the polarity value is less than 3.5, it is difficult to sufficiently increase the fluorescence value. Table 1 shows polarity values of the compounds having the primary or secondary amide group. The polarity value was calculated by using a software for calculating the molecular orbital, i.e., Win MOPAC (calculation condition: Hamiltonian AM1, produced by Fujitsu).

TABLE 1

| Compound | Polarity value |
| --- | --- |
| Acetamide | 3.8 |
| Urea | 3.6 |
| ε-Caprolactam | 4.0 |
| Hydantoin | 2.4 |
| Dimethylhydantoin | 2.8 |
| Succinimide | 2.4 |

It is preferable that the content of the compound having the primary or secondary amide group is 3.0 to 10.0% by weight with respect to the total amount of the fluorescent water base ink for ink-jet recording. If the content is less than 3.0% by weight, it is difficult to exhibit any sufficient effect to increase the fluorescence value. If the content exceeds 10.0% by weight, the ink discharge stability is affected, because the ink has a high viscosity. More preferably, the content is 5.0 to 8.0% by weight.

The reason, why the compound having the primary or secondary amide group has the effect to enhance the fluorescent value of the fluorescent water base ink for ink-jet recording, is considered as follows. When the oxygen atom and the nitrogen atom of the functional group ($R^1$) bonded to the xanthene skeleton of the fluorescent dye represented by the formula (1) form the hydrogen bond with the hydrogen atom of the compound having the primary or secondary amide group, the oxygen atom and the nitrogen atom of the fluorescent dye are electrically charged. Accordingly, the difference appears in electric charge in the molecule of the fluorescent dye, and the electron flow is caused. Thus, the fluorescence is amplified. Therefore, as the polarity of the compound having the primary or secondary amide group is larger, the hydrogen bond is formed more easily, resulting in the appearance of the difference in electric charge in the molecule of the fluorescent dye. Therefore, the effect to increase the fluorescence value is enhanced. According to the hypothesis presented by the inventors that the fluorescence is amplified by the hydrogen bond formed between the fluorescent dye and the compound having the amide group as described above, it is preferable that the compound having the amide group exists in an amount of certain extent with respect to the fluorescent dye. According to the results of experiments as described later on, it has been revealed that the molar ratio of the compound having the amide group with respect to the fluorescent dye in the ink is desirably not less than 30 and especially desirably not less than 50.

The fluorescent water base ink for ink-jet recording of the present invention contains water. As for the water, it is preferable to use those having high purities such as ion exchange water and distilled water other than ordinary water. The content of the water also depends on, for example, the desired characteristic of the ink, and the types and the compositions of the pigment and the fluorescent dye represented by the formula (1). However, it is preferable that the content is 10.0 to 95.0% by weight with respect to the total amount of the fluorescent water base ink for ink-jet recording. If the content is less than 10.0% by weight, the ratio of the components other than water is necessarily increased. Therefore, the ink is blurred in some cases when the printing is performed on the paper, and the ink is hardly introduced in other cases because the viscosity is increased. If the content exceeds 95.0% by weight, then the ink viscosity is excessively increased after the volatile components are evaporated, and the discharge failure is sometimes caused. More preferably, the content is 30.0 to 90.0% by weight.

The fluorescent water base ink for ink-jet recording of the present invention is basically composed as described above. However, the ink may contain, for example, conventionally known various moistening agents, permeating agents, surfactants, viscosity-adjusting agents, surface tension-adjusting agents, pH-adjusting agents, metal rust-preventive agents, specific resistance-adjusting agents, film-forming agents, ultraviolet-absorbing agents, antioxidizing agents, antifading agents, and antiseptic/fungicidal agents depending on the purpose to improve various performance including, for example, the discharge stability, the adaptability with respect to materials for the head and the ink cartridge, the storage stability, the image storage performance and the like. When the fluorescent water base ink for ink-jet recording of the present invention is applied to the ink-jet system in which the jetting operation is performed in accordance with the action of thermal energy, it is also possible to adjust thermal physical values including, for example, the specific heat, the coefficient of thermal expansion, and the coefficient of thermal conductivity.

The present invention will be explained in further detail below as exemplified by Examples. However, the present invention is not limited to these Examples.

EXAMPLES 1 TO 4

C.I. Solvent Red 43, 49, 72 were used as the fluorescent dyes, a self-dispersing pigment or CAB-O-JET 260 (produced by Cabot) was used as the pigment, and urea, ε-caprolactam, acetamide, or succinimide was used as the compound having the primary or secondary amide group. Ink materials having compositions as shown in Table 2 were agitated, followed by being filtrated through a membrane filter of 2.5 μm to prepare inks. In Table 2, the concentration of the ink materials are represented by weight percent. The self-dispersing pigment was prepared in accordance with the following procedure. 20 g of a quinacridone pigment and 500 g of quinoline were mixed with each other, followed by being dispersed for 3 hours by using a bead mill. Water was removed as extremely as possible from the obtained mixture under a reduced pressure. The temperature was raised to 160° C., and 20 g of sulfonated pyridine complex was added to perform agitation for 4 hours in order to obtain a slurry. The obtained slurry was washed with quinoline, poured into water, and then washed with water and dried. After that, the pigment concentration was adjusted to 15% by weight with water to obtain a 15% by weight dispersion of the surface-treated quinacridone pigment. The molar ratio of the employed fluorescent dye and the compound having the amide group are shown in Table 2.

TABLE 2

| | | Ex. 1 | Ex. 2 | Ex. 3 | Ex. 4 |
|---|---|---|---|---|---|
| Fluorescent dye | C.I. Solvent Red 43 | 0.5 | — | — | — |
| | C.I. Solvent Red 49 | — | 1.2 | — | — |
| | C.I. Solvent Red 72 | — | — | 1.0 | 1.0 |
| Pigment | Self-dispersing pigment (15 wt %) | 12.0 | — | 6.0 | 6.0 |
| | CAB-O-JET 260 (10 wt %) | — | 15.0 | — | — |
| Compound having primary or secondary amide group | Urea | 8.0 | — | — | — |
| | ε-Caprolactam | — | 4.0 | — | — |
| | Acetamide | — | — | 6.0 | — |
| | Succinimide | — | — | — | 6.0 |
| Moistening agent | Glycerol | 25.0 | 25.0 | 25.0 | 25.0 |
| Solvent | Pure water | 54.5 | 54.8 | 62.0 | 62.0 |
| Molar ratio of compound having amide group to dye | | 169 | 13 | 50 | 30 |
| Fluorescence value | | 360 | 210 | 300 | 220 |

COMPARATIVE EXAMPLES 1 TO 7

C.I. Solvent Red 43, 49, 72 were used as the fluorescent dyes, a self-dispersing pigment or CAB-O-JET 260 (produced by Cabot) was used as the pigment, urea was used as the compound having the primary or secondary amid group, and N-methylcaprolactam, N,N-dimethylacetamide, or N-methylsuccinimide was used as the compound without having the primary or secondary amide group. Ink materials having compositions as shown in Table 3 were agitated, followed by being filtrated through a membrane filter of 2.5 μm to prepare inks. In Table 3, the concentration of the ink materials are represented by weight percent. The molar ratio of the compound having the amide group to the employed fluorescent dye is shown in Table 3.

TABLE 3

| | | Com. Ex. 1 | Com. Ex. 2 | Com. Ex. 3 | Com. Ex. 4 | Com. Ex. 5 | Com. Ex. 6 | Com. Ex. 7 |
|---|---|---|---|---|---|---|---|---|
| Fluorescent dye | C.I. Solvent Red 43 | 0.5 | — | — | — | — | — | 0.5 |
| | C.I. Solvent Red 49 | — | 1.2 | 1.2 | — | — | — | — |
| | C.I. Solvent Red 72 | — | — | — | 1.0 | 1.0 | 1.0 | — |
| Pigment | Self-dispersing pigment (15 wt %) | 12.0 | — | — | 6.0 | 6.0 | 6.0 | — |
| | CAB-O-JET 260 (10 wt %) | — | 15.0 | 15.0 | — | — | — | — |
| Compound having primary or secondary amide group | Urea | — | — | — | — | — | — | 8.0 |
| | ε-Caprolactam | — | — | — | — | — | — | — |
| | Acetamide | — | — | — | — | — | — | — |
| | Succinimide | — | — | — | — | — | — | — |
| Compound without having primary or secondary amide group | N-methylcaprolactam | — | — | 4.0 | — | — | — | — |
| | N,N-dimethylacetamide | — | — | — | — | 6.0 | — | — |
| | N-methylsuccinimide | — | — | — | — | — | 6.0 | — |
| Moistening agent | Glycerol | 25.0 | 25.0 | 25.0 | 25.0 | 25.0 | 25.0 | 25.0 |
| Solvent | Pure water | 62.5 | 58.8 | 54.8 | 68.0 | 62.0 | 62.0 | 66.5 |
| Molar ratio of compound having amide group to dye | | — | — | 11 | — | 35 | 27 | 169 |
| Fluorescence value | | 120 | 110 | 180 | 130 | 170 | 150 | 480 |

EVALUATION

Evaluation was made in accordance with the following methods for the inks prepared in Examples 1 to 4 and Comparative Examples 1 to 7. In the evaluation, an ink-jet recording apparatus MFC-5100J (produced by Brother Industries, Ltd.) was used. A recording sample, in which the recording was performed on regular paper (XEROX 4200), was used. A portion of the recording sample, in which the coating ratio was 100%, was used.

(1) Measurement of OD Value

OD values of recording samples were measured with an optical density meter (X-Rite 400, produced by X-Rite) at a measuring wavelength of 620 nm by using the inks prepared in Examples 1 to 4 and Comparative Examples 1 to 7 to make the evaluation on the basis of the following criteria. ++: OD value was not less than 0.8, +: OD value was not less than 0.7 to less than 0.8, ±: OD value was not less than 0.5 to less than 0.7, and −: OD value was less than 0.5.

(2) Measurement of Fluorescence Value

Fluorescence values of recording samples were measured with a fluorescence spectrophotometer (F-4500, produced by Hitachi) by using the inks prepared in Examples 1 to 4 and Comparative Examples 1 to 7. The wavelength of an exciting light source during the measurement of the fluorescence value was 254 nm, and the fluorescence-measuring wavelength was 600 nm. The evaluation was made on the basis of the following criteria. ++: fluorescence value was not less than 270, +: fluorescence value was not less than 200 and less than 270, ±: fluorescence value was not less than 150 and less than 200, and −: fluorescence value was less than 150. The measured fluorescence values are described in Tables 2 and 3.

TABLE 4

| | OD value | Fluorescence value |
|---|---|---|
| Example 1 | ++ | ++ |
| Example 2 | ++ | + |
| Example 3 | + | ++ |
| Example 4 | + | + |

TABLE 4-continued

| | OD value | Fluorescence value |
|---|---|---|
| Comparative Example 1 | ++ | − |
| Comparative Example 2 | ++ | − |
| Comparative Example 3 | ++ | ± |
| Comparative Example 4 | + | − |
| Comparative Example 5 | + | ± |
| Comparative Example 6 | + | ± |
| Comparative Example 7 | − | ++ |

As clarified from Table 4, both of the OD value and the fluorescence value were the satisfactory values for each of the inks prepared in Examples. On the contrary, any one of the OD value and the fluorescence value was the insufficient value for each of the inks prepared in Comparative Examples.

EXAMPLES 5 TO 9

The composition of the ink containing C.I. Solvent Red 43 of Example 1 was changed to have various values as shown in Table 5, and the change of the fluorescence value was measured. In Examples 5 and 6, the concentration of C.I. Solvent Red 43 was changed from the composition of Example 1 respectively while the concentration of the pure water was changed to balance the concentration change of C.I. Solvent Red 43. In Examples 7 and 8, the concentration of the pigment was changed from the composition of Example 1 respectively while the concentration of the pure water was changed to balance the concentration change of the pigment. In Example 9, the concentration of urea was changed from the composition of Example 1 while the concentration of the pure water was changed to balance the concentration change of urea. In the table, the concentrations of C.I. Solvent Red 43 and urea are represented by the molar concentrations, and the molar ratio (ratio of the compound having the amide group to the dye) therebetween is also shown in Table 5. The OD value and the fluorescence value were measured respectively in the same manner as in Example 1. The fluorescence value and results of the evaluation are shown in Table 5. The reason, why the fluorescence value of Example 5 is relatively low, is considered to be such that the concentration of C.I. Solvent Red 43 is absolutely low. The reason, why the fluorescence value of Example 6 is relatively low, is considered to be such that the concentration of C.I. Solvent Red 43 is high, and the self-quenching occurs.

TABLE 5

| | Molecular weight | Ex. 5 | Ex. 6 | Ex. 7 | Ex. 8 | Ex. 9 |
|---|---|---|---|---|---|---|
| C.I. Solvent Red 43 | 645 | $7.7 \times 10^{-5}$ | $3.4 \times 10^{-3}$ | $7.7 \times 10^{-4}$ | $7.7 \times 10^{-4}$ | $7.7 \times 10^{-4}$ |
| Self-dispersing pigment | — | (12.0) | (12.0) | (3.0) | (22.0) | (12.0) |
| Urea | 60 | $1.3 \times 10^{-1}$ | $1.3 \times 10^{-1}$ | $1.3 \times 10^{-1}$ | $1.3 \times 10^{-1}$ | $1.6 \times 10^{-2}$ |
| Molar ratio of compound having amide group to dye | — | 1690 | 38 | 169 | 169 | 21 |
| OD value | | — | ++ | ++ | ± | ± | ++ |
| Fluorescence value | | — | ± | ± | ++ | + | ± |
| | | (150) | (160) | (430) | (200) | (160) |

In order to investigate the relationship between the fluorescence value and the molar ratio of the compound having the amide group with respect to the dye, a graph was prepared as shown in FIG. 1 by using the results of Example 1, Comparative Example 1, and Example 9 based on the use of C.I. Solvent Red 43, Examples 3 and 4 and Comparative Example 4 based on the use of C.I. Solvent Red 72, and Example 2 and Comparative Example 2 based on the use of C.I. Solvent Red 49. According to the results shown in FIG. 1, it is appreciated that the fluorescence value is increased as the molar ratio of the compound having the amide group to the dye is increased. In particular, the following fact is appreciated. That is, it is desirable that the molar ratio of the compound having the amide group with respect to the dye is not less than 30 in order to obtain the good fluorescence value (evaluation: (+)), and the molar ratio of the compound having the amide group with respect to the dye is not less than 50 in order to obtain the best fluorescence value (evaluation: (++)).

The problem involved in the conventional technique has been sufficiently solved by the fluorescent water base ink for ink-jet recording of the present invention. When the pigment and the fluorescent dye represented by the formula (1) are contained, it is possible to realize the fluorescent water base ink for ink-jet recording having the excellent water resistance and the vivid color development. Further, when the compound having the primary or secondary amide group is contained, it is possible to avoid any decrease in fluorescence value which would be otherwise caused by the presence of the pigment, and it is possible to obtain the sufficient fluorescence value, even when the fluorescent dye and the pigment are used in combination. Further, when the self-dispersing pigment is used as the pigment, it is possible to perform the stable discharge without causing the decrease in surface tension and the occurrence of deposition.

Therefore, according to the present invention, it is possible to provide the water base ink for ink-jet recording which makes it possible to obtain a sufficient OD value and a fluorescence value while securing the vivid color development and the excellent water resistance.

What is claimed is:

1. A fluorescent water base ink for ink-jet recording comprising:
water;
a self-dispersing pigment;
a compound having primary or secondary amide group; and
a fluorescent dye represented by the following formula (1):

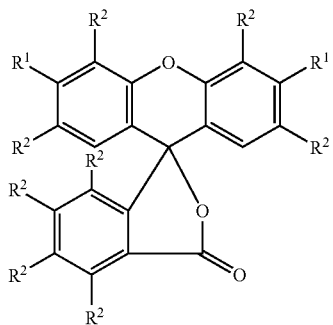
(1)

wherein $R^1$ independently represents OH or $N(R^3)R^4$, $R^2$ independently represents hydrogen atom or halogen atom, $R^3$ represents hydrogen atom or alkyl group having a number of carbon atom or atoms of 1 to 5, and $R^4$ represents hydrogen atom or alkyl group having a number of carbon atom or atoms of 1 to 5.

2. The fluorescent water base ink for ink-jet recording according to claim 1, wherein a molar ratio of the compound having the primary or secondary amide group to the fluorescent dye is not less than 30.

3. The fluorescent water base ink for ink-jet recording according to claim 1, wherein the fluorescent dye is one selected from the group consisting of C.I. Solvent Red 43, 48, 49, 72, and 73.

4. The fluorescent water base ink for ink-jet recording according to claim 1, further comprising glycerol.

5. The fluorescent water base ink for ink-jet recording according to claim 1, wherein the compound having the primary or secondary amide group has a polarity value of not less than 3.5.

6. The fluorescent water base ink for ink-jet recording according to claim 1, wherein the compound having the primary or secondary amide group is one selected from the group consisting of acetamide, urea, ϵ-caprolactam, and succinimide.

7. An ink cartridge comprising the fluorescent water base ink for ink-jet recording as defined in claim 1.

* * * * *